United States Patent
Konradi

(10) Patent No.: US 10,167,033 B2
(45) Date of Patent: Jan. 1, 2019

(54) AIRFLOW SHAPING ENCLOSURE REDUCING DRAG BEHIND CYCLIST

(71) Applicant: Vadim Anderson Konradi, Austin, TX (US)

(72) Inventor: Vadim Anderson Konradi, Austin, TX (US)

(*) Notice: Subject to any disclaimer, the term of this patent is extended or adjusted under 35 U.S.C. 154(b) by 66 days.

(21) Appl. No.: 15/469,495

(22) Filed: Mar. 25, 2017

(65) Prior Publication Data

US 2018/0273127 A1 Sep. 27, 2018

(51) Int. Cl.
*B62J 17/00* (2006.01)
*B62J 7/04* (2006.01)

(52) U.S. Cl.
CPC .............. *B62J 17/00* (2013.01); *B62J 7/04* (2013.01)

(58) Field of Classification Search
CPC ........ B62J 17/00; B62J 2017/083; B62J 7/04; B62D 35/00; B62D 35/007
USPC .............. 296/180.1; 224/412, 425, 427
See application file for complete search history.

(56) References Cited

U.S. PATENT DOCUMENTS

| | | | | |
|---|---|---|---|---|
| 3,984,142 A | * | 10/1976 | Van Valkenburgh | B62J 17/065 2/456 |
| 4,326,728 A | * | 4/1982 | Tatch | B62J 17/00 280/288.2 |
| 4,813,583 A | * | 3/1989 | Carpenter | B62J 7/00 224/421 |
| 4,964,484 A | * | 10/1990 | Buell | B60K 11/08 180/219 |
| 5,222,752 A | * | 6/1993 | Hewitt | B62J 11/00 224/420 |
| 6,427,890 B1 | * | 8/2002 | Meng | B62J 11/00 220/23.83 |
| 9,394,011 B1 | * | 7/2016 | Hanagan | B62J 17/00 |
| 2006/0186159 A1 | * | 8/2006 | Lawrence | B62J 7/04 224/422 |
| 2007/0090140 A1 | * | 4/2007 | Chuang | B62J 7/04 224/427 |
| 2012/0211535 A1 | * | 8/2012 | Nehring | B62J 9/00 224/433 |

FOREIGN PATENT DOCUMENTS

WO  WO 92/12040  *  7/1992  ............... B62J 9/00

OTHER PUBLICATIONS

Computer translation of WO 92/12040 performed on Jul. 26, 2018 (Year: 1992).*

* cited by examiner

Primary Examiner — Gregory A Blankenship

(57) ABSTRACT

An airflow shaping enclosure is mounted to the rear of a cyclist riding a bicycle. The airflow shaping enclosure is wide at its front and tapers toward its rear, maintaining and shaping airflow streamlines behind the cyclist. The forward section of the airflow shaping enclosure is shaped to match the rear of the cyclist and to fill space behind the cyclist's buttocks, back, and calves. The rear section of the airflow shaping enclosure is shaped to form a streamlined extension of the cyclist's body. The airflow shaping enclosure fore-aft and height locations are adjustable to minimize the gap between the airflow shaping enclosure and the cyclist's buttocks, back, and thighs. The airflow shaping enclosure is configured to carry luggage.

14 Claims, 12 Drawing Sheets

AIRFLOW SHAPING ENCLOSURE REDUCING DRAG BEHIND CYCLIST

BACKGROUND OF THE INVENTION

FIELD OF THE INVENTION

The present invention relates generally to improving the aerodynamics of a cyclist and decreasing the aerodynamic drag force acting upon the cyclist. Particularly, the invention relates to an airflow shaping enclosure mounted to the bicycle frame, situated behind the cyclist, filling unoccupied volume behind the cyclist, shaping the airflow, and decreasing flow separation and generation of trailing vortices, and resultant aerodynamic drag. The airflow shaping enclosure is further configured to carry luggage.

PATENTS CITED 639,708 Certain
U.S. Pat. No. 2,675,151 Herbert
U.S. Pat. No. 3,984,142 Van Valkenburgh
U.S. Pat. No. 4,066,290 Wiegert
U.S. Pat. No. 4,350,361 Fujii
U.S. Pat. No. 4,411,443 Pollard
U.S. Pat. No. 4,566,617 Jackson
U.S. Pat. No. 4,733,907 Fellenbaum
U.S. Pat. No. 4,813,583 Carpenter
U.S. Pat. No. 5,267,767 Farrow
U.S. Pat. No. 5,324,059 Bryne
U.S. Pat. No. 5,348,253 Gratzer
U.S. Pat. No. 5,830,329 Weissenberger
U.S. Pat. No. 5,887,280 Waring
U.S. Pat. No. 6,438,755 MacDonald
U.S. Pat. No. 6,889,992 Vroomen
U.S. Pat. No. 7,946,605 Lane
U.S. Pat. No. 8,172,247 Weber
U.S. Pat. No. 8,985,417 Brown

PRIOR ART AND MOTIVATION FOR THE INVENTION

Bicycles have historically been adapted to carry luggage of various sorts. Luggage has typically been attached to frames mounted on the front or rear of the bicycle, located over and beside the wheels. Fujii in U.S. Pat. No. 4,350,361 and Weissenberger in U.S. Pat. No. 5,830,329 disclose load carrying racks for the rear of a bicycle. Luggage has typically been mounted on the sides of frames mounted beside the wheels, an arrangement known as panniers. Certain in U.S. Pat. No. 639,708 disclosed panniers mounted beside both front and rear wheels of a bicycle. Luggage may also be carried on top of racks over the wheels. Herbert in U.S. Pat. No. 2,675,151 disclosed a basket mounted on top of a rear rack. Smaller u age carriers may be mounted to the bicycle seat, extending rearward. Jackson in U.S. Pat. No. 4,566,617 disclosed a seat pack assembly. An object large in the vertical dimension may be mounted erectly behind the cyclist. Brown in U.S. Pat. No. 8,985,417 discloses a garment back mounted high behind the cyclist, and configured to pivot freely in the wind.

Luggage carriers are known to increase aerodynamic drag, as compared to the aerodynamic drag of the cycle and cyclist configured without the luggage carrier. Carpenter in U.S. Pat. No. 4,813,583 disclosed hard shells shaped to improve aerodynamic drag, enclosing pannier bags mounted beside the bicycle wheels. This invention was claimed to improve the aerodynamic drag of the cycle with pannier bags and fairings as compared to drag of the cycle with pannier bags alone. According to Carpenter's patent disclosure, the drag of a cycle equipped with pannier bags and fairings was still greater than the drag of the cycle equipped without bags and fairings.

For a bicycle traveling on level terrain, the majority of the cyclist's physical exertion is expended to counteract the forces of aerodynamic drag. Aerodynamic drag may be categorized into skin friction drag and pressure (form) drag. A body with good aerodynamic drag properties should have a smooth exterior to minimize skin drag, and the amount of exposed skin area should be minimized. The shape should enable laminar flow on surfaces to the greatest extent possible, since laminar flow has lower drag than turbulent flow. More importantly the body should be shaped to avoid airflow separation. Separation leads to generation of vortex flows which transfer kinetic energy from the cyclist and bicycle into kinetic energy contained in trailing airflow vortexes, resulting in increased drag force. Flow separation and the generation of vortices cause the majority of aerodynamic drag on a cyclist.

For a cyclist riding on a bicycle, airflow impinging on the cyclist's torso passes between and around the cyclist's arms, toward the cyclist's chest, then around the torso sides and over the back and buttocks. Airflow impinging on the cyclists head and face travels over and around the head, then over the cyclist's back. Upon reaching the cyclist's back and buttocks, flows from the head and flows passing around the sides of the cyclist's torso separate and become detached, creating low-pressure regions. Flow circulation is generated in the low pressure regions, and that flow circulation bends into vortices which trail from the regions of the cyclists back and buttocks. Moving air in these trailing vortices represents energy expended by the cyclist and transferred to the air. Airflow around the cyclist is affected by the relative position of the legs. When one leg is raised and the other extended, flow across the cyclist's chest is crowded by the raised thigh and tends to flow preferentially across the chest toward the side with the extended thigh. Flows around the thighs detach from the back sides of the thighs, creating low pressure regions, flow circulation, and energy loss in trailing vortices.

Reynolds number is a dimensionless quantity used in fluid mechanics to characterize the tendencies of fluid flow. Mathematically it is the ratio of inertial forces to viscous forces. It is calculated as a function of velocity and dimension of a moving object, and dynamic and kinematic viscosity and density of the fluid. A Reynolds number of 500,000 represents the approximate boundary between laminar and turbulent flow. Flow at higher Reynolds numbers will be generally turbulent, and flow at lower Reynolds numbers will be generally laminar.

A bicyclist traveling at a velocity on the order of touring or racing speed has a Reynolds number of approximately 500,000. This means the flow characteristics lie on the boundary between laminar and turbulent. Flow at the front of the cyclist may be laminar, then transitioning to turbulent toward the rear of the cyclist. Given this Reynolds number boundary region of operation, it may be possible to manipulate the flow characteristics toward laminar or turbulent in order to affect aerodynamic drag.

Laminar flow attached to a surface has a lower drag characteristic than turbulent flow attached to a surface. As long as flow remains attached, lowest drag is achieved if the flow is laminar.

For a body in an airstream, a typical first strategy for minimizing flow drag is to orient the body with its longer dimension in the direction of the airstream. This minimizes frontal area, defined as the shape of the object projected onto a plane perpendicular to the flow direction. Static pressure exerted by the airstream upon the body surface is a function of the flow velocity. Static pressure decreases with increasing flow velocity. Over the front portion of the object, as the body cross sectional area is increasing, the flow is accelerating, so the static pressure is decreasing. Under these circumstances flow typically remains attached to the surface of the body. After the flow has passed the widest section of the body, the static pressure exerted by the fluid tends to decrease. When static pressure decreases with increased flow length along the body, this is referred to as a negative pressure gradient. Flow in a negative pressure gradient is more likely to separate from the surface, causing form (pressure) drag. To minimize drag, it is desirable to prevent flow separation, or if flow separation cannot be prevented, to delay flow separation to as far rearward as possible, and to minimize the amount of energy transferred to rotating flow vortices. Turbulent flow may stay attached better in a negative pressure gradient than laminar flow. In the circumstance of a negative pressure gradient, it may be desirable to cause the flow to transition to turbulent, helping the flow remain attached.

In summary, to minimize aerodynamic drag, a hierarchy of strategies can be stated as:
1. Minimize frontal area.
2. Avoid flow separation.
3. If flow separation must occur, try to re-attach it and minimize the amount of energy transferred to rotational flow.
4. Encourage turbulent flow to occur where this improves the pressure gradient and keeps the flow attached.
5. Prefer laminar to turbulent flow. Maintain laminar flow over the front of bodies and as far rearward as possible.

A bicycle frame can be shaped to minimize aerodynamic drag. Vroomen in U.S. Pat. No. 6,889,992 and Lane in U.S. Pat. No. 7,946,605 disclose aerodynamic bicycle frames. But the cyclist's body contributes disproportionally more to aerodynamic drag than the bicycle itself. Only limited aerodynamic improvement may be achieved by streamlining the bicycle alone. It is well understood that a cyclist's position may be adapted to decrease drag, in general by lowering and flattening the rider's back. The bicycle frame and steering system may be adapted to place the cyclist in a lower, more aerodynamic position. Weber in U.S. Pat. No. 8,172,247 discloses a bicycle handlebar assembly for this purpose. But a low, aerodynamic racing cyclist pose may be uncomfortable for a casual or recreational rider.

A cyclist may decrease aerodynamic drag by wearing tight fitting, smooth clothing. MacDonald in U.S. Pat. No. 6,438,755 disclosed a full body suit intended to improve a cyclist's aerodynamics and reduce drag. Smooth clothing contributes to lower drag, but most of the cyclist's overall aerodynamic drag consists of form drag resulting in separated flow. An effort may be made to decrease form drag through clothing. Waring in U.S. Pat. No. 5,887,280 disclosed a helmet and clothing for cyclists fitted with vortex generators intended to generate turbulence and delay separation of airflow from the cyclist's body.

The bicycle and cyclist may be enclosed in a fairing to achieve lower drag. Wiegert in U.S. Pat. No. 4,066,290, Farrow in U.S. Pat. No. 5,267,767, and Bryne in U.S. Pat. No. 5,324,059 disclose streamlined bicycle fairings mounted in front of the cyclist to reduce aerodynamic drag. But streamlining only the front of the cyclist does not address the problem of form drag and separation occurring at the rear of the cyclist. To minimize drag, it is desirable that the cycle and cyclist together form a smooth shape, tapered towards the rear.

To most optimally address drag, a fairing may be designed to fully enclose the cyclist and bicycle. Van Valkenburgh in U.S. Pat. No. 3,984,142 disclosed an aerodynamic enclosure fitted around the cyclist. Pollard in U.S. Pat. No. 4,411,443 disclosed an aerodynamic fairing fitted around a prone recumbent bicycle frame. Streamlined full fairings have been highly successful at reducing cyclist's drag and achieving much higher speeds than an un-faired cyclist can achieve. There are races in which such faired vehicles compete, and the vehicles achieve much higher speeds than un-faired cyclists. But such full fairings are heavy. They are cumbersome to enter and exit. Full fairings prevent the cyclist obtaining good ventilation and cooling airflow. Full fairings often limit the rear vision of the cyclist, making it harder to ride in traffic. As a result full fairings remain generally unpopular with the public.

As is well known in the field of bicycle racing, a trailing cyclist closely following a leading cyclist obtains an aerodynamic advantage from a leading cyclist. This is referred to as drafting. The trailing cyclist drafting in the wake of another expends less energy to travel at the same speed than they would riding alone. Studies indicate that the air pressure generated by the trailing cyclist can lead to a slightly decreased drag on the leading cyclist as well. In drafting configuration, a leading and trailing cyclist travel with less aggregate energy expenditure than if they were traveling separately at the same speed. For a fixed total energy expenditure, a pair of leading and trailing cyclist are able to travel in a drafting configuration at a higher speed than they could each attain separately.

When establishing an aerodynamic drafting configuration, it is desirable to optimally match the shape of the following body to that of the leading body. It is desirable that flow streamlines around the leading body are carried rearward and continue around the shape of the following body with minimal disturbance. This may be achieved by shaping the following body as a streamlined continuation of the leading body. Relative offsets of the body surfaces in the direction perpendicular to the flow direction should be avoided. It is desirable to minimize the gap between leading and following bodies. If a gap between the bodies cannot be avoided, the following body should be shaped to follow a continuous streamline from the leading body. This minizes the gap area and the volume available in which to generate rotational airflow, and promotes re-attachment of the flow to the surface of the following body.

Summary of the need: A cyclist desires to minimize energy expenditure while traveling at a certain speed, or to achieve higher speed without expending additional effort. The majority of energy expended by the cyclist goes toward counteracting aerodynamic drag. The total of aerodynamic drag forces on a bicycle and cyclist are dominated by drag forces acting on the cyclist's body. The major drag contribution is form drag. Form drag acts on multiple parts of the cyclist's body which do not have a streamlined shape, and which shed trailing vortices in airflow behind the cyclist. The largest trailing vortices are generated by the low pressure region behind the cyclist's back and buttocks. It is desirable to minimize vortex generation from this area. It is desirable to obtain some fraction of the drag reduction possibly achievable with a full fairing, but without the disadvantages of a full fairing. It is desirable for a cyclist riding alone to obtain similar drag reduction advantages to those conferred by cycling with others in a drafting configuration. When a cyclist carries luggage, it is desirable that the carried luggage not cause an increase in drag. In the best case, the addition of an appropriately-shaped luggage carrier may result in a net decrease in drag of the combination of cyclist, bicycle and luggage carrier as compared to the drag of the cyclist and bicycle without luggage carrier.

SUMMARY OF THE INVENTION

The goals of decreasing aerodynamic drag on a cyclist are addressed by the present invention, which consists of placing an airflow shaping body directly behind the cyclist, and supporting the airflow shaping body in this position by mounting it to the bicycle.

The added airflow shaping body continues the shape of the cyclist into the general shape of the rear section of an airfoil, or the rear section of a naturally streamlined body such as a fish. The maximum width of the airflow shaping body is substantially similar to the width of the cyclist's body at the buttocks. The airflow shaping body is shaped such that flow streamlines which originate around the front of the cyclist are continued along the sides, top, and bottom of the airflow shaping body, and brought together smoothly at the rear of the airflow shaping body.

The airflow shaping body may be supported by the bicycle frame, or an extension of the bicycle frame such as a luggage carrier rack connected to the bicycle frame or bicycle seat tube. The height of the airflow shaping body is adjustable, and is preferably set to approximately match the height of the cyclist's rear torso, hips, buttocks, and upper calves, thus matching airflow streamlines in the vertical plane as well as the horizontal plane. The fore-aft position of the airflow shaping body is adjustable, making it possible to minimize the gap between the airflow shaping body and the rear of the cyclist's buttocks to optimize the aerodynamic flow and drag reduction, or to select a position which is a compromise between drag reduction and cyclist comfort.

The airflow shaping body may optionally be protruded forward under the bicycle seat to fill space behind and below the cyclist's buttocks and calves. The lower protrusion may be formed as part of the rigid lower structure of the airflow shaping body. Or to aid in integration and mounting of the airflow shaping body to the bicycle, the lower protrusion may be formed as a separate part, attachable to the airflow shaping body or alternately to the bicycle frame or frame extension.

The airflow shaping body may be truncated before it completes a full taper. This is known as a boat-tail configuration. It represents a useful tradeoff between increased form drag and decreased skin drag. The boat-tail configuration also results in a smaller overall bag length for a given width. The boat tail configuration bag has reduced side area, so is less susceptible to lateral forces from cross winds.

The boat tail truncation of the airflow shaping body rear may be equipped with a mount for a reflector or safety light. The mount may incorporate a tubular feature designed to accept a typical reflector or light intended for mounting on a bicycle frame tube or bicycle seat tube. The mount may alternately function as a carrying handle for the airflow shaping body.

The airflow shaping body encloses useful space. It may be constructed as a hollow enclosure for carrying luggage, with a means to open and close it. It may be configured as a box plus lid. The luggage carrier may be opened to access luggage, and closed securely for travel. The closure may be secured by means of snaps, buckles, zipper, or other suitable means.

DETAILED DESCRIPTION OF THE INVENTION

The drawings begin with portrayals of key aspects fluid flow around simple objects, both streamlined and otherwise. These flow aspects are illustrated in 2-dimensional configurations for clarity and simplicity. Next are illustrated aspects of airflow around a cyclist. Following are illustrations of the invention, and the improved airflow conferred by the invention.

Figure 1:
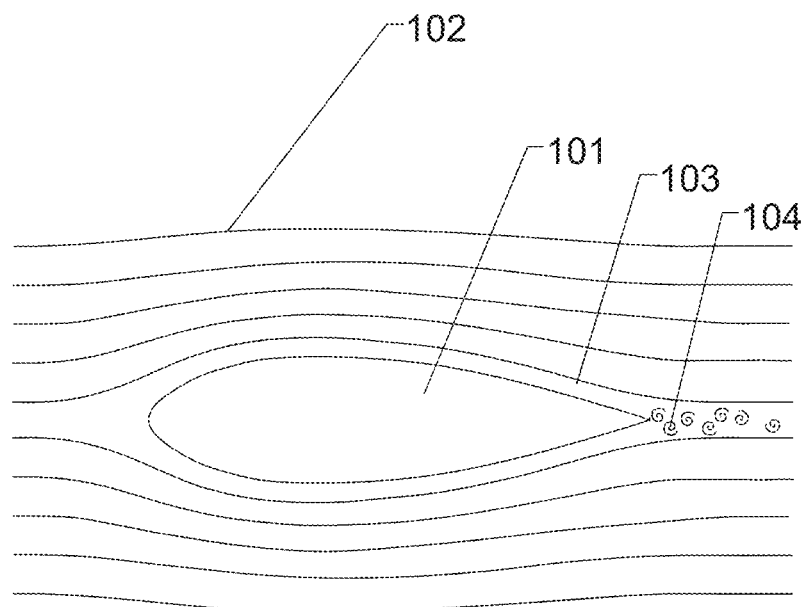
FIG. 1 illustrates 2-dimensional flow around a streamlined body.

FIG. 1 illustrates 2-dimensional flow around a streamlined body. The 2-dimensional configuration is illustrated as a basis for understanding the 3-dimensional flow of the invention. Free stream flow 102 is traveling toward and past the streamlined body 101. A streamlined body is an ideal configuration to establish a low-drag flow condition. A key characteristic of a streamlined body is attached flow 103, and minimal turbulence 104.

Figure 2:
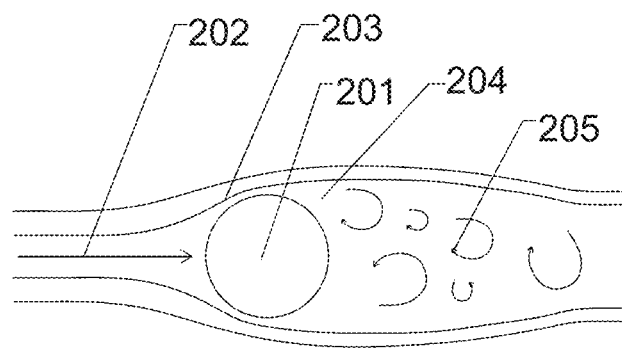
FIG. 2 illustrates 2-dimensional flow around a cylindrical body.

FIG. 2 illustrates 2-dimensional flow around a cylinder. The 2-dimensional configuration is illustrated as a basis for understanding the 3-dimensional flow of the invention. Impinging free stream flow 202 meets the cylinder 201. Flow stays attached as it traverses the cylinder leading edge 203. Upon passing the cylinder maximum width, flow separation from the cylinder trailing side 204 occurs, and trailing vortices 205 occur in the wake of the cylinder. Vortices represent rotational energy which is transferred to the air. Transferred energy results in drag on the cylinder versus the free stream flow.

Figure 3:
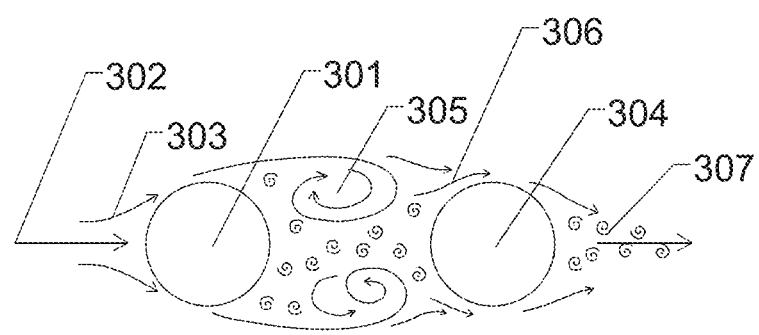
FIG. 3 illustrates 2-dimensional flow around a pair of cylindrical bodies in tandem.
Figure 4:
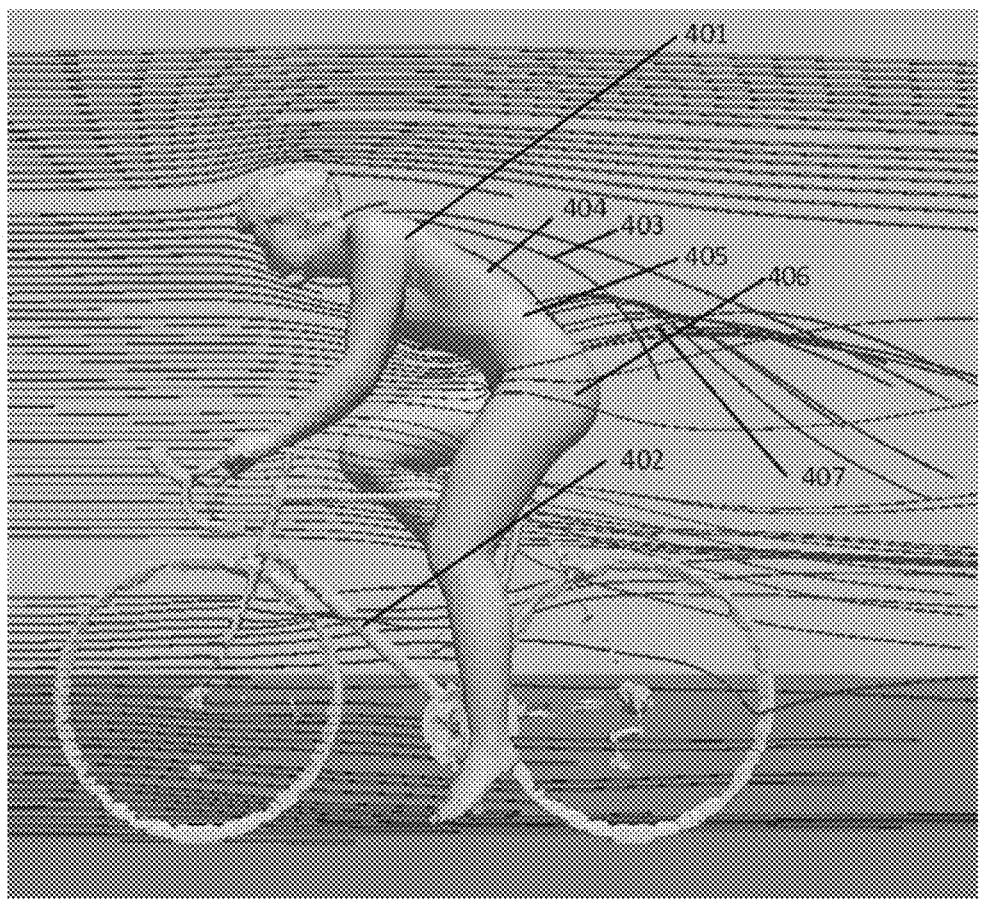
FIG. 4 is a side view of a cyclist on a bicycle, and mid-plane flow contours.

FIG. 3 illustrates 2-dimensional flow around a pair of cylindrical bodies in tandem. The 2-dimensional configuration is illustrated as a basis for understanding the 3-dimensional flow of the invention. Impinging free stream flow 302 meets the leading cylinder 301. Flow is attached 303 at the leading cylinder leading edge. The situation up to this point is similar to flow around the single cylinder. In this configuration however, there is a trailing cylinder 304 following the leading cylinder. As flow passes the leading cylinder, it separates, resulting in some vortices 305 behind the leading cylinder. Flow which detached from the leading cylinder reattaches 306 to the surface of the trailing cylinder. In this combination of leading cylinder and trailing cylinder, trailing vortices 307 behind the trailing cylinder are smaller than in the single cylinder configuration FIG. 4 is a side view of flow around a cyclist 401 riding on a bicycle 402. In general the airflow around the cyclist is 3-dimensional and complex to illustrate. In this figure, for clarify of illustration, only the flow originating specifically on the medial plane of the cyclist is illustrated. The airflow remains attached 403 to the cyclist's back 404, but flow in the region of the cyclist's lower back 405 and buttocks 406 generates a trailing vortex 407.

Figure 5:
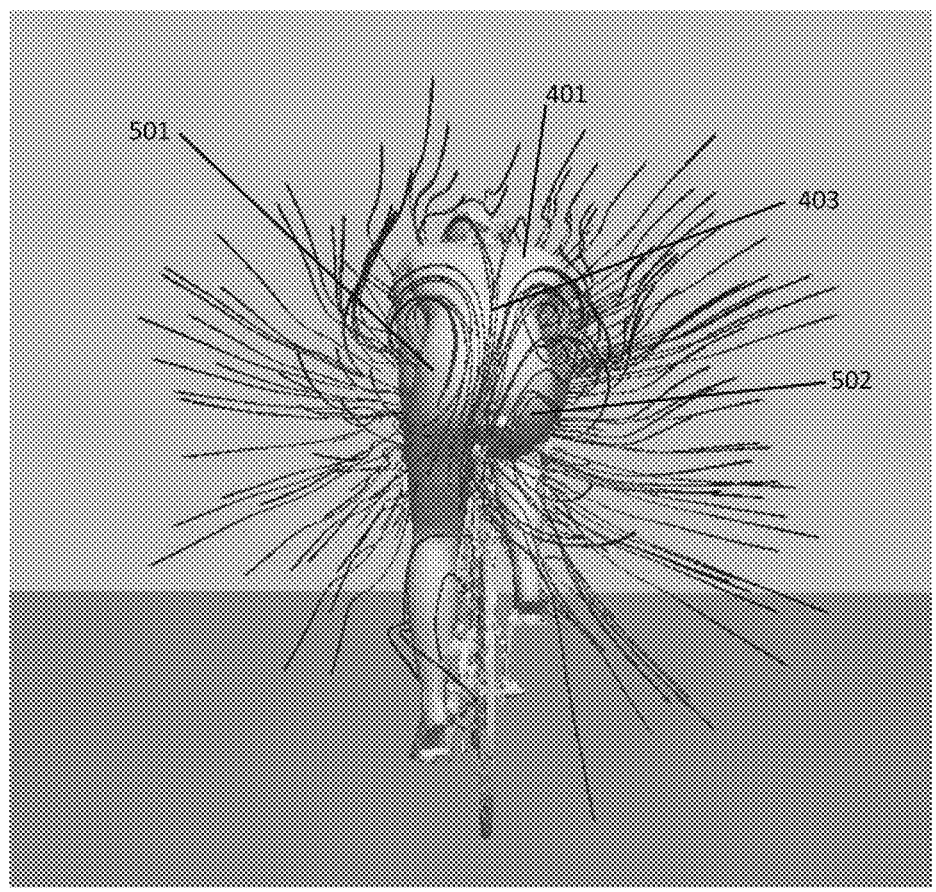
FIG. 5 is a rear view of 3-dimensional flow around a cyclist on a bicycle.

FIG. 5 is a rear view of 3-dimensional flow around a cyclist on a bicycle. Flow remains attached down the centerline of the cyclist's back 403. Flow meeting the left side of the cyclist's torso travels around the cyclist's left side and generates a clockwise trailing vortex 501. Flow meeting the right side of the cyclist's torso similarly generates a counterclockwise trailing vortex 502.

Figure 6A:
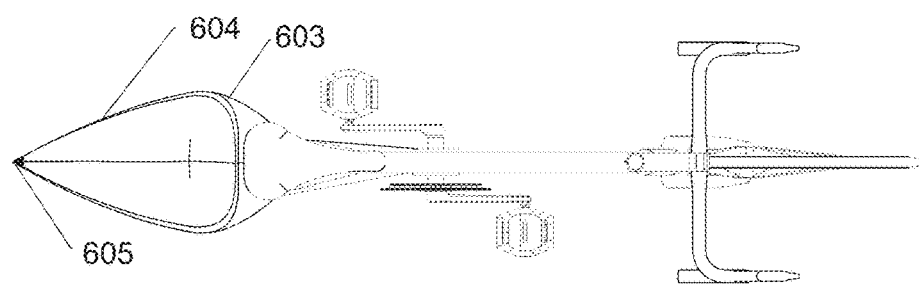
FIG. 6A, is a side view of an airflow shaping enclosure mounted on a bicycle.
Figure 6B:
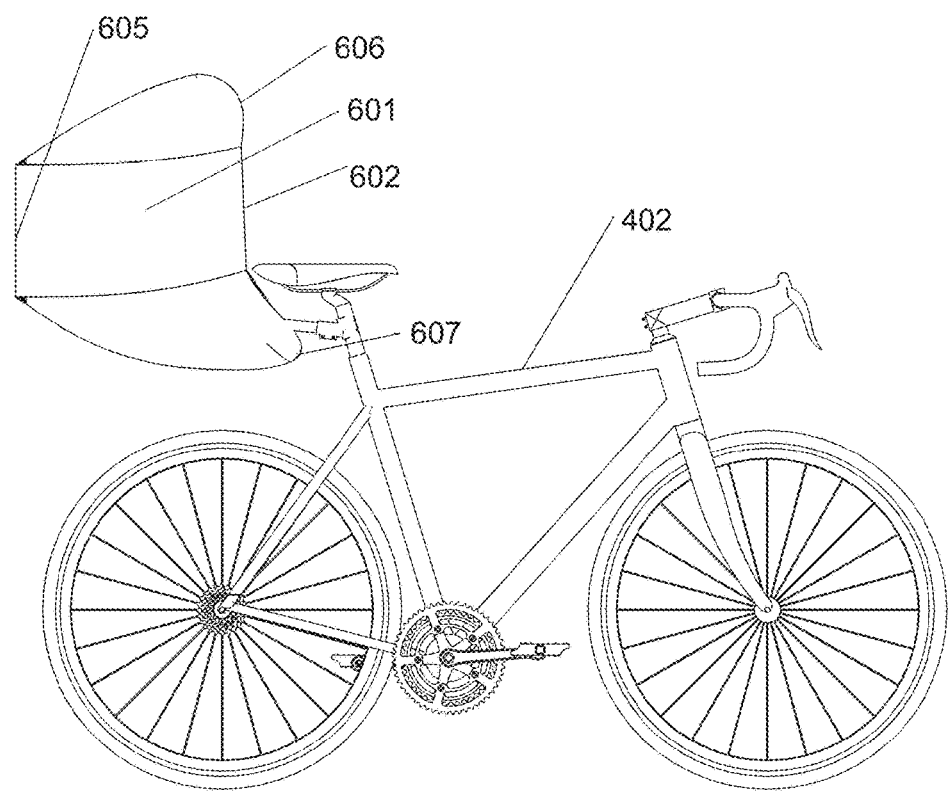
FIG. 6B is an overhead view of an airflow shaping enclosure mounted on a bicycle.
Figure 6C:
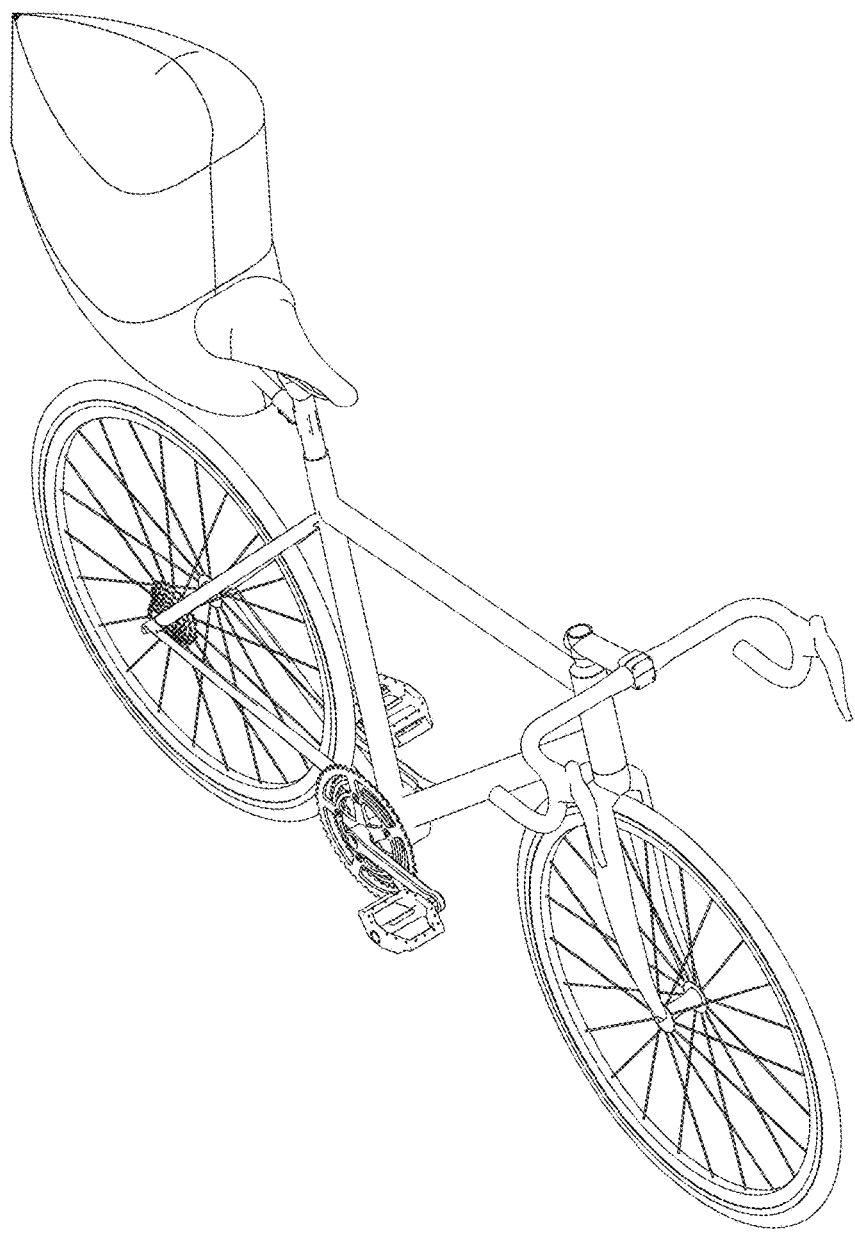
FIG. 6C is an oblique front view of an airflow shaping enclosure mounted on a bicycle.
Figure 6D:
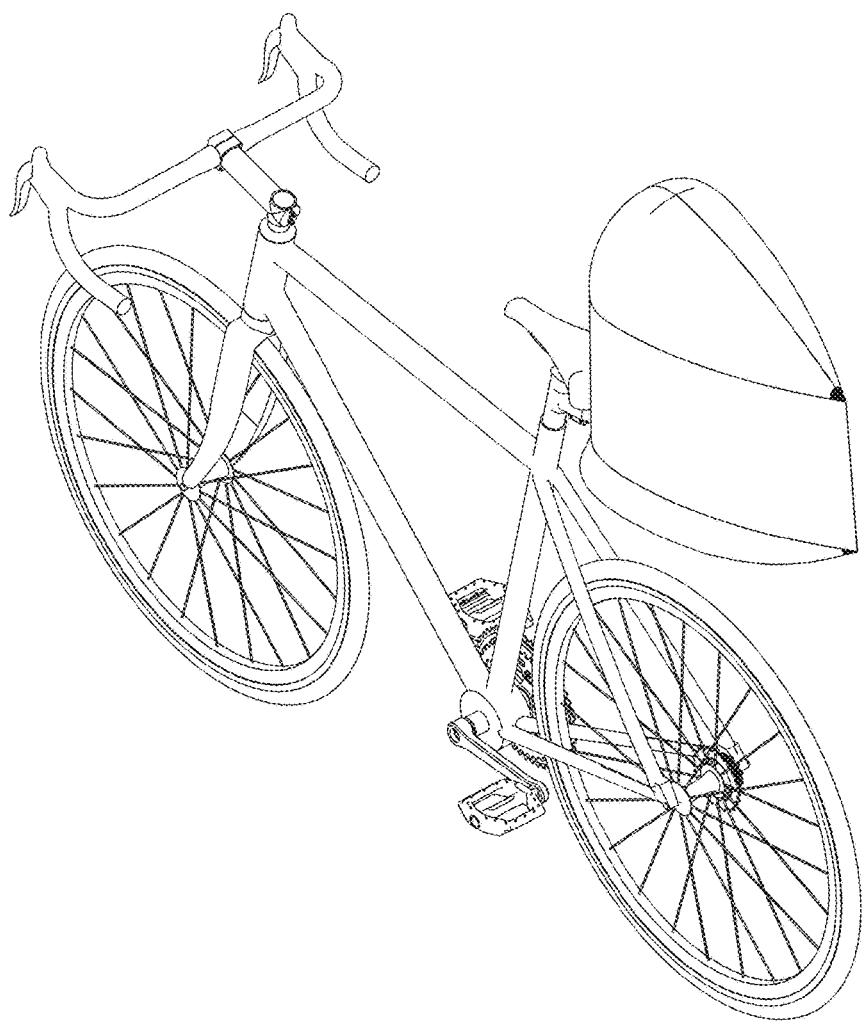
FIG. 6D is an oblique rear view of an airflow shaping enclosure mounted on a bicycle.

FIG. 6A, FIG. 6B, FIG. 6C, FIG. 6D describe the configuration of an airflow shaping enclosure 601 attached to a bicycle 402. FIG. 6A illustrates leading face 602, rounding in the horizontal plane 603 blending between the leading face and the taper 604, and finally into a tail 605. FIG. 6B indicates rounding in the vertical plane 606 leading to the tail 605. FIG. 6B indicates a protrusion 607 under the seat. FIGS. 6C and 6D further illustrate the 3-dimensional form of the airflow shaping enclosure and its relationship to the bicycle.

Figure 7:
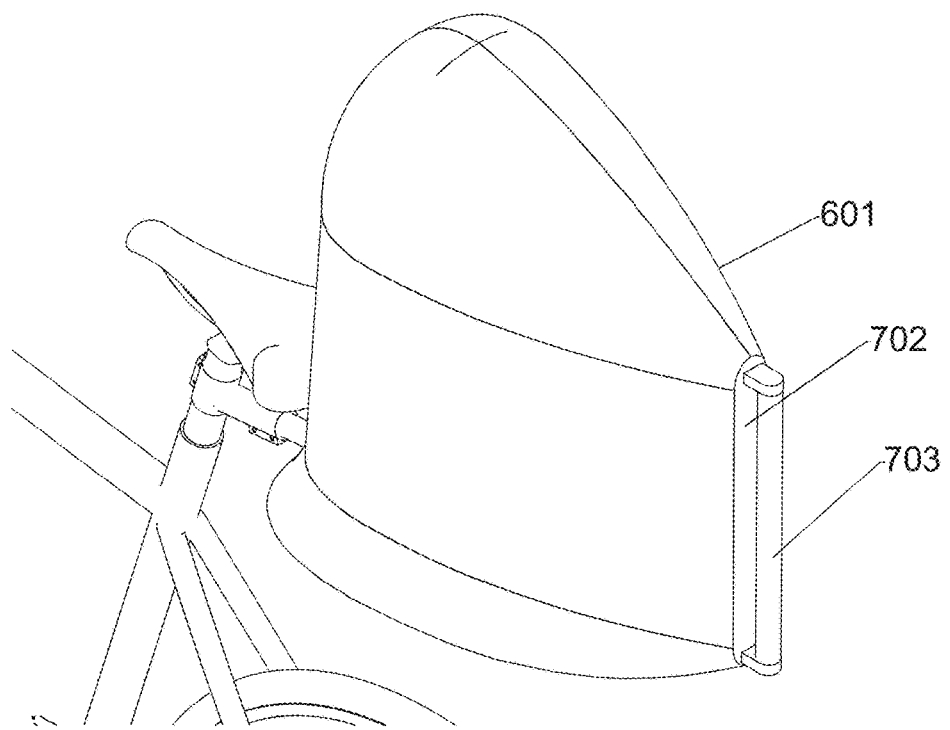
FIG. 7 is an oblique rear view illustrating truncation of the tail of the airflow shaping enclosure and provision of a mounting feature on the truncated tail.

FIG. 7 illustrates truncation 702 of the tail of the airflow shaping enclosure 601. A accessory mounting feature 703 is attached to the truncation.

Figure 8:
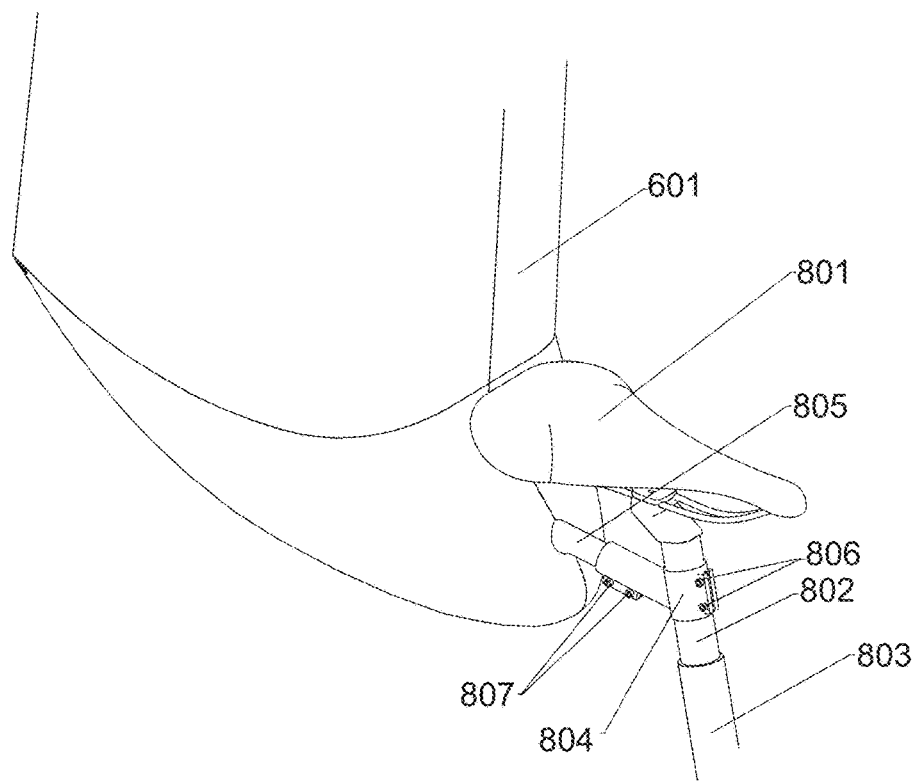
FIG. 8 is an oblique front view illustrating attachment of the airflow shaping enclosure to the bicycle.

FIG. 8 illustrates mounting of the airflow shaping enclosure 601. The bicycle seat tube 802 resides within the bicycle frame seat post tube 803. A bracket 804 is fixed to the seat post. The bracket is adjustable in height along the seat post. A cantilever beam 805 interfaces with the bracket and supports the airflow shaping enclosure. The airflow shaping enclosure position is adjustable in a fore-aft direction along the axis of the cantilever beam. Vertical fixing screws 806 on the bracket lock the bracket in position on the seat post. Horizontal fixing screws 807 lock the cantilever beam with respect to the bracket.

Figure 9:
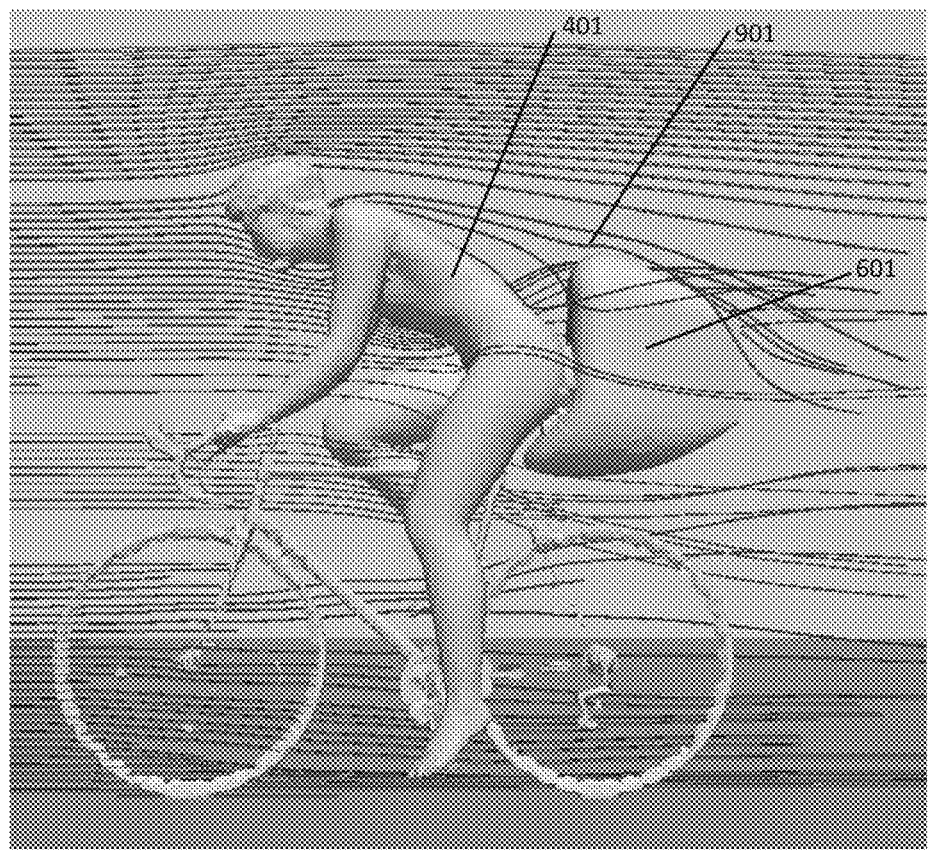
FIG. 9 is a side view of the cyclist and airflow shaping enclosure, and mid-plane airflow.

FIG. 9 is a side view of airflow originating in the midplane around the cyclist 401 and airflow shaping enclosure 601. Due to the influence of the airflow shaping enclosure, the flow over the cyclist's back 901 remains attached along the combination of cyclist's back and airflow shaping enclosure, decreasing aerodynamic drag.

Figure 10:
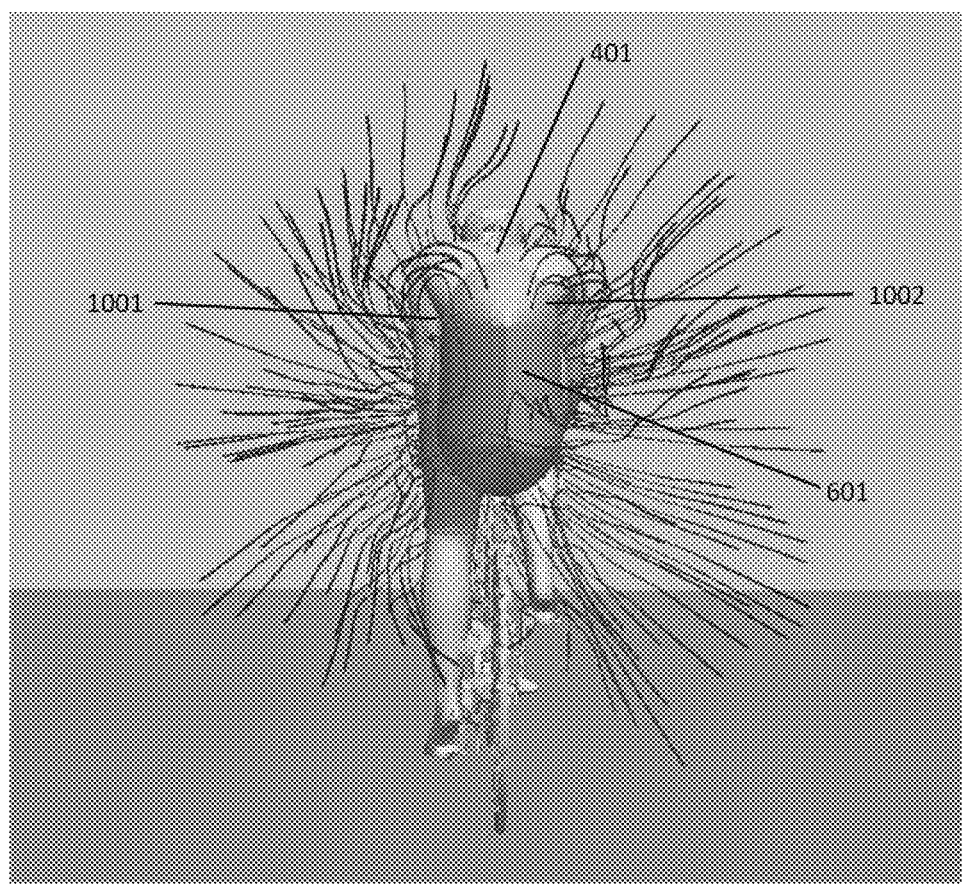
FIG. 10 is a rear view of 3-dimensional flow around the cyclist and airflow shaping enclosure.

FIG. 10 is a rear view of 3-dimensional flow around the cyclist 401 and airflow shaping enclosure 601. Left trailing vortex 1001 and right trailing vortex 1002 are smaller than the vortices occurring without benefit of the airflow shaping enclosure.

Figure 11:
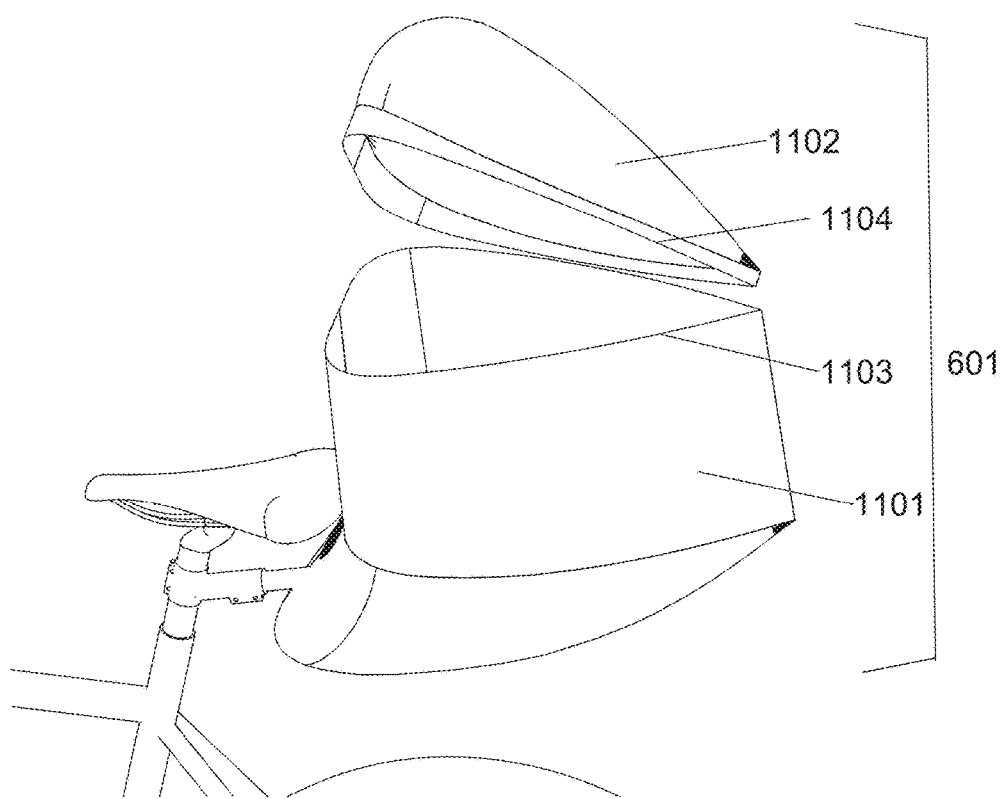
FIG. 11 is an oblique rear view illustrating an opening system for the airflow shaping enclosure.

FIG. 11 is an oblique rear view illustrating the airflow shaping enclosure 601 in an opened condition. The airflow shaping enclosure is composed of a lower base section 1101, and a cap section 1102. The sections interface through the base section edge 1103 and the cap section edge 1104.

What is claimed is:

1. An airflow shaping enclosure mounted behind a cyclist, the enclosure having a front width profile substantially matching a width of the cyclist's lower back, hips and buttocks, a front height substantially midway between the cyclist's waist and shoulder height, a shape tapered from a maximum area cross sectional area at a front to a minimum cross sectional area at a rear, and a top of the enclosure is located entirely above a plane defined by a back of the cyclist.

2. An airflow shaping enclosure mounted behind a cyclist, the enclosure having a front width profile substantially matching a width of the cyclist's lower back, hips and buttocks, a front height substantially midway between the cyclist's waist and shoulder height, a shape tapered from a maximum area cross sectional area at a front to a minimum cross sectional area at a rear, and the front has a convex shape facing airflow.

3. The airflow shaping enclosure of claim 2 or 1, wherein forward edges and corners are rounded.

4. The airflow shaping enclosure of claim 3, wherein the rear is truncated prior to completing a full taper to zero cross section to form a truncation.

5. The airflow shaping enclosure of claim 4 wherein the truncation includes an accessory mounting feature.

6. The airflow shaping enclosure of claim 3, wherein section of the enclosure below a bicycle seat is protruded forward to fill volume behind the cyclist's calves.

7. The airflow shaping enclosure of claim 6, wherein the protruded section is a separable unit.

8. The airflow shaping enclosure of claim 3, wherein the enclosure may be opened and its internal volume may be used for storage and transport of luggage.

9. The airflow shaping enclosure of claim 3 wherein the enclosure is mounted to the bicycle or to an accessory rack fixed to the bicycle.

10. The airflow shaping enclosure of claim 9 wherein the enclosure mounting consists of a cantilever beam mounted to a bicycle seat post.

11. The airflow shaping enclosure of claim 9 wherein the enclosure mounting to the bicycle is adjustable in height and in fore-aft position.

12. The airflow shaping enclosure of claim 11 wherein the enclosure is mounted via horizontal position adjustment means, the horizontal position adjustment means including a fixing means to lock the horizontal position.

13. The airflow shaping enclosure of claim 11 wherein the enclosure is mounted via vertical position adjustment means, the vertical position adjustment means including a fixing means to lock the vertical position.

14. The airflow shaping enclosure of claim 8 wherein a top of the enclosure comprises a cap which opens with respect to a substantially horizontal separation.

* * * * *